July 14, 1931.  E. STAUDER  1,814,266
SAW GAUGE
Filed July 5, 1928  3 Sheets-Sheet 1

INVENTOR
Emanuel Stauder
BY
his ATTORNEYS

July 14, 1931.  E. STAUDER  1,814,266
SAW GAUGE
Filed July 5, 1928   3 Sheets-Sheet 2
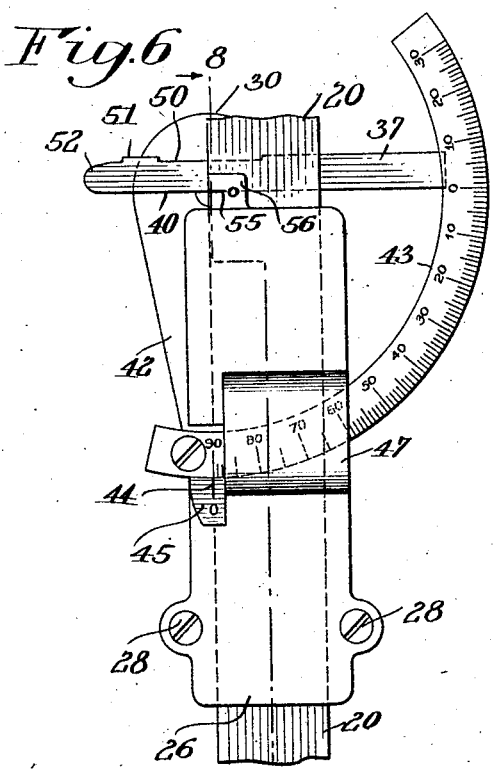
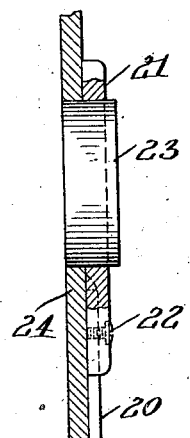
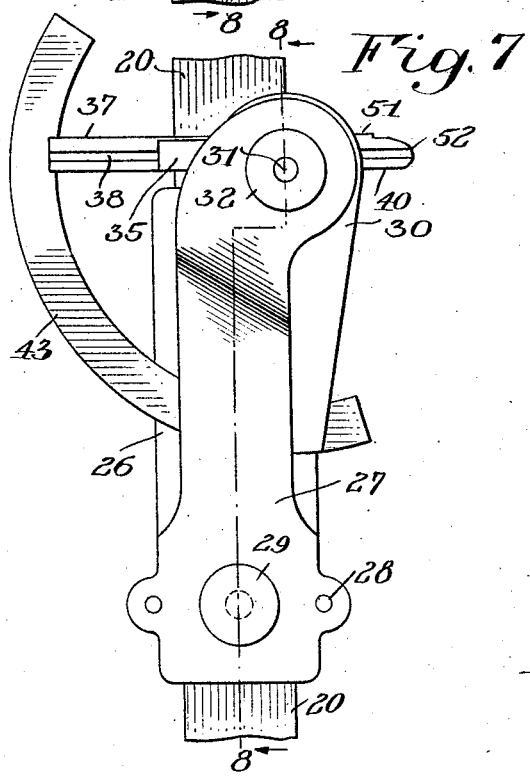
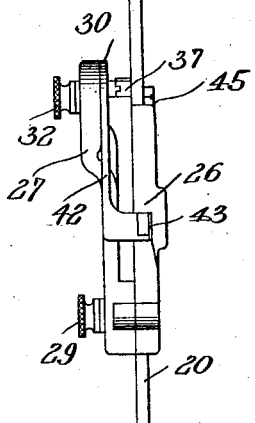
INVENTOR
Emanuel Stauder
BY
Livingston & Griffith
his ATTORNEYS July 14, 1931.  E. STAUDER  1,814,266
SAW GAUGE
Filed July 5, 1928  3 Sheets-Sheet 3
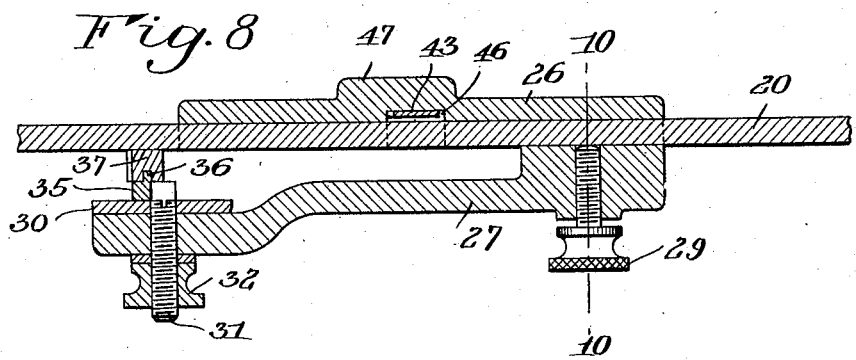
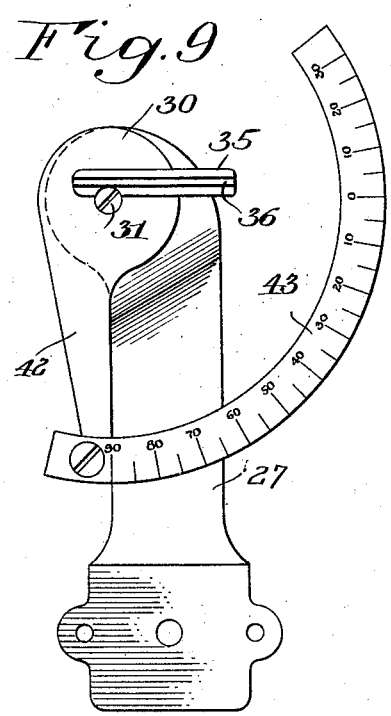
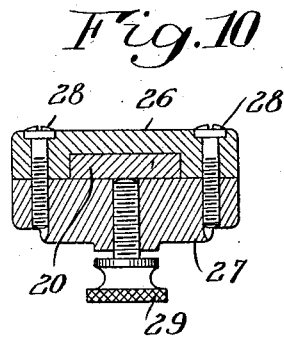
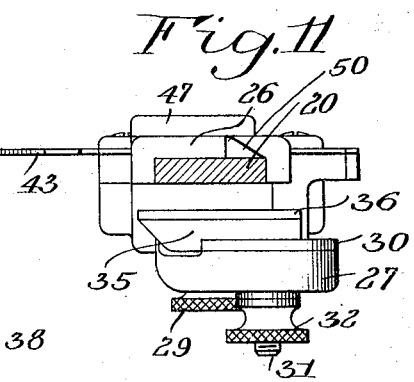
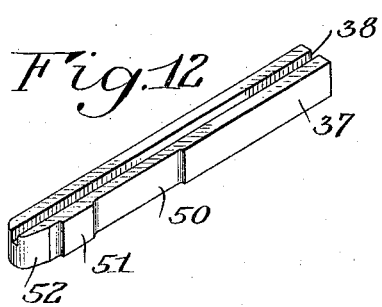
INVENTOR
Emanuel Stauder
BY
his ATTORNEYS Patented July 14, 1931

1,814,266

UNITED STATES PATENT OFFICE

EMANUEL STAUDER, OF ROCHESTER, NEW YORK, ASSIGNOR TO HUTHER BROTHERS SAW MANUFACTURING COMPANY, OF ROCHESTER, NEW YORK, A CORPORATION OF NEW YORK

SAW GAUGE

Application filed July 5, 1928. Serial No. 290,448.

This invention relates to a saw gauge and has for its principal object the provision of an improved gauge whereby the angular characteristics of saw teeth as well as the height of various teeth may be tested or gauged.

Another object of the invention is the provision of a device of this nature which is simple and inexpensive to construct and which is of rugged construction so that it will not easily become out of order.

It is still a further object to provide a saw gauging device which may be used on saws of various dimensions, and which is also applicable equally well to circular saws or to straight saws such as band saws, hacksaws, and the like.

Still another object of the invention is to provide a gauge for use in testing the difference in height between high teeth and low teeth on a saw.

An additional object is the provision of a gauge so constructed that it may be used effectively on saws having either deep or shallow spaces between the teeth.

To these and other ends the invention resides in certain improvements and combinations of parts, all as will be hereinafter more fully described, the novel features being pointed out in the claims at the end of the specification.

In the drawings:

Fig. 5 is an edge view of one embodiment of the device, with parts of the device and parts of a saw in section;

Fig. 6 is an enlarged front elevation illustrating details of a part of the device;

Fig. 7 is a rear elevation of the parts shown in Fig. 6;

Fig. 8 is a longitudinal vertical section on the lines 8—8 of Figs. 6 and 7;

Fig. 9 is a front view of a portion of the device with parts removed;

Fig. 10 is a transverse section substantially on the line 10—10 of Fig. 9;

Fig. 11 is an end view of the device;

Fig. 12 is a perspective view of a gauging arm, showing it in inverted or upside down position.

Similar reference numerals throughout the several views indicate the same parts.

Figure 1:
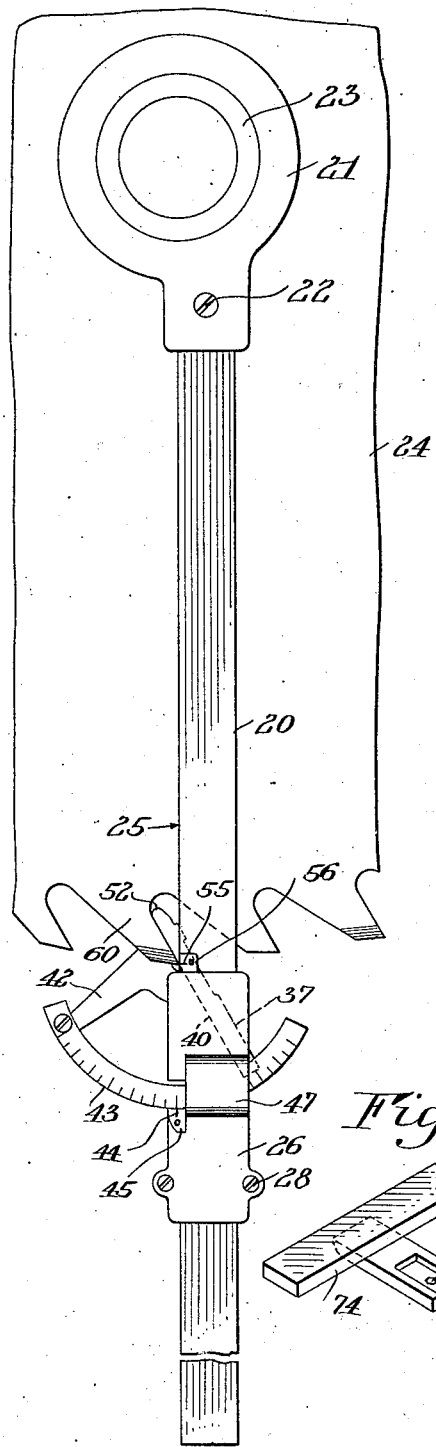
Fig. 1 is a plan of a device constructed in accordance with one embodiment of the invention, applied to a circular saw, showing the use of the device in gauging the angle of the forward edge of a tooth.

As is well understood by those skilled in the art, the height and angular characteristics of saw teeth have an important bearing on the satisfactory operation of the saw. It is therefore extremely important both in the original manufacture of saws and in their subsequent resharpening, to control these features within comparatively narrow limits. The present invention is designed to provide an effective and satisfactory device for use in gauging both the height and the angular characteristics of the saw teeth, so that these features may be of the proper dimensions. The invention is of use not only to the original manufacturer of saws, but also to those who repair, resharpen, or in other ways work with saws.

According to one embodiment of the invention, illustrated in Figs. 1 to 12 inclusive, there is provided a movable member such as the bar 20 having a fixture 21 removably secured to one end by means such as the screw 22. This fixture comprises an annular member adapted to be placed over a mandrel or centering device 23 which is fitted in the usual arbor opening at the center of a circular saw 24. The fixture 21 has a snug pivotal fit on the mandrel 23 so that the bar 20 may be rotated around the mandrel 23 as a center. Thus the fixture 21 and the mandrel 23 form means for guiding the movements of the member 20 relative to the saw.

Saws of different sizes may have arbor openings of different dimensions, which would necessitate the use of various sizes of mandrels. For this reason, a number of fixtures 21 may be provided of various dimensions, and any one of the fixtures may be easily attached to or detached from the bar 20 simply by screwing or unscrewing the screw 22. It will be understood, of course, that for any particular saw to be gauged, a fixture 21 will be chosen which is of the proper dimensions to fit the mandrel 23 which fits the arbor hole in the saw.

From an inspection of Fig. 1, it will be noted that the bar 20 is connected to the fixture 21 in a somewhat offset position, so that the left hand edge 25 of the bar 20 is exactly in alinement with the center of the opening in the fixture. Hence, no matter to what position around the saw the bar 20 may be moved, its edge 25 will always extend along a true radius of the saw.

Slidably mounted on the bar 20 is a frame best shown in Figs. 6 to 11 inclusive. This frame includes a top plate 26, which extends over the top of the bar 20 and which has depending flanges at the sides so as to constitute a channel through which the bar 20 passes. A bottom plate 27 is fixed to the plate 26 at one end by means such as the screws 28, and constitutes a closure for the open side of the channel formed in the top plate 26, thus retaining the frame on the bar 20 and allowing it to slide longitudinally thereon while preventing lateral or vertical displacement. A thumb screw 29 is provided which may be tightened to hold the frame in any desired position on the bar 20.

The end of the bottom plate 27 opposite to that through which the screws 28 and thumb screw 29 extend, is spaced from the bar 20 by a distance somewhat greater than the thickness of the thickest saw to be gauged, as shown in Fig. 8, and carries near its end a pivotally mounted member 30 rotatable about an axis such as the screw 31. A thumb nut 32 is provided on the screw 31 so that this screw may be tightened to hold the pivotally mounted member 30 in any position to which it has been adjusted. The screw 31, constituting the axis of rotation of the member 30, is directly in alinement with the edge 25 of the bar 20, so that the member 30 always rotates about an axis which passes through the radius defined by the edge 25 of the bar 20, no matter to what circumferential position around the saw the bar 20 may be moved.

The pivotally mounted member 30 includes a portion 35 formed integrally therewith or fixed thereto. This portion is in the nature of a rectilinear guideway and has a central rib 36 extending therealong, as shown plainly in Figs. 8 and 9. An arm 37, best shown in perspective in Fig. 12, has a central groove 38, which is arranged to receive the rib 36 of the guideway 35, and thus the arm is capable of a longitudinal sliding motion back and forth relative to its guideway 35 and to the pivotally mounted member 30 on which this guideway is mounted. The guideway 35 is so placed relative to the axis 31 of the member 30 that the arm 37, when positioned on the guideway, has one edge 40 in alinement with the pivot.

It is obvious from the foregoing description that the arm 37 may rotate as a unit with the member 30 about the pivotal axis 31. Since the axis of rotation intersects the edge 25 of the bar 20 and also intersects the edge 40 of the arm 37, it follows that the axis of rotation of the arm 37 coincides with the intersection of a vertical plane passing through the edge 25 of the bar 20 and another vertical plane passing through the edge 40 of the arm 37. The axis of rotation is in no way affected by movement of the arm 37 longitudinally along its guideway 35. It is seen that the arm may be projected as far as desired to either side of its pivotal axis, and thus the arm may be said to be movable radially with respect to its own axis of rotation.

Scale means may be provided for indicating the position of the arm 37 with respect to any suitable datum or reference point. This means, in the present instance, may include an arm 42 (Figs. 1, 5 and 9) attached to the member 30 or formed integrally therewith, and serving as a support for a scale 43, which may be of arcuate shape and may be graduated in any suitable manner. As shown especially in Fig. 6, the scale in the illustrative embodiment disclosed is graduated in degrees, and the markings thereon cooperate with a zero index 44 formed on a beveled portion 45 of the top plate 26 of the frame. The scale 43 lies in a plane just above the top of the bar 20, and in certain positions extends across the top of this bar through a passageway 46 formed in the top plate 26 of the slidable frame, as shown in Fig. 8, the top plate being provided with a thickened portion or lug 47 extending over the passageway 46 to strengthen the plate at this point.

As is illustrated in Fig. 6, the graduations on the scale 43 are so placed relative to the zero index 44 that the scale will read the number of degrees in the angle between the edge 40 of the arm 37 and the edge 25 of the bar 20. In Fig. 6 the scale is illustrated as reading 90°, and it is seen that the arm 37 extends at a right angle to the bar 20. Furthermore, it is apparent that if the arm 37 be rotated so that its edge 40 coincides with the edge 25 of the bar, then the scale will read 0°. These scale markings are only illustrative, and any other suitable graduations could be used if desired, although it is convenient in practice to utilize the degrees of the angular relation between the arm 37 and the bar 20 as the unit of measurement.

The edge of the arm 37 opposite to and substantially parallel to the edge 40 is of somewhat irregular shape, as best shown in Figs. 6 and 12. It will be observed that this opposite edge has a notch 50 having a flat bottom of substantial length, the bottom of this notch being parallel to the edge 40 of the arm. At one end of this notch 50 is a lug 51, and beyond this lug the end of the arm is straight for some distance as at 52a in alinement with the bottom of the notch 50, and beyond this straight portion 52a it is somewhat tapered off as at 52 so that it may extend into the small spaces between the comparatively close teeth of certain saws.

As is understood by those skilled in the art, some saws are made with "high" and "low" teeth, the high teeth usually being beveled at their corners so that they will cut only at the center of the kerf, while the low teeth cut at the sides and finish out the kerf to its full width. The difference in height between the high and low teeth is usually comparatively slight, such as about 0.025 inch, although it may vary somewhat in different saws. The height of the lug 51 or the amount by which the top of this lug is offset relative to the bottom of the notch 50 and to the abutment portion 52a, is equal to the desired difference in height between the high teeth and the low teeth of the saw being tested.

A number of arms 37 provided with lugs 51 of different heights for use when gauging different saws, may be furnished with each saw gauge. The user may remove one arm 37 and substitute another having a lug of the proper size, simply by sliding the arm 37 endwise in either direction until it is freed of its guideway 35 and by sliding the other arm endwse onto the guide. From the description which has been given above, it is obvious that the arm 37 is free to move longitudinally, although lateral movement in one plane is prevented by the engagement of the guiding rib 36 in the groove 38, while lateral movement in a perpendicular direction, tending to separate the arm 37 from its guideway, is prevented by the lower surface of the bar 20, which bears against the upper surface of the arm 37 as is shown most clearly in Fig. 8.

In operation, the device may be applied to a circular saw in the manner described above, so that the fixture 21 and the arm 20 may be rotated circumferentially to any desired position about the center of the saw as an axis. It is desirable in saws to have the angles of all of the teeth the same, and this saw gauge may be used to check the angular characteristics of the teeth.

Fig. 1 shows the device as used for determining the angle of the front of a tooth. The bar 20 is brought to such a position that its radial edge 25 is in alinement with the tip of one saw tooth, such as 60. The frame comprising the plate 26 and associated parts is then slid along the bar 20 until the pivotal axis 31 is directly in alinement with the tip of the selected tooth 60. As an aid in determining when this alinement exists, the top plate 26 may have an index mark 55 formed on a beveled lug 56, the mark 55 being in alinement with the pivotal axis 31 so that when this mark is at the tip of the tooth, the axis of rotation will be in proper position.

The edge 40 of the arm 37 is then placed in contact with the forward edge of the saw tooth 60, as shown clearly in Fig. 1, the arm being moved longitudinally to project as far as possible into the space between the tooth 60 and the next tooth, in order that a more accurate reading may result from having a greater length of the arm in alinement with the edge of the saw tooth. When the parts have been positioned in this manner, the graduation on the scale 43 which is opposite to the zero index 44 may be read, and thus the angle between the forward edge of the saw tooth and a radius drawn from the tip of the tooth to the center of the saw may be determined.

The bar 20 may then be moved around a slight distance to bring the edge 40 of the arm 37 into contact with the forward edge of the next tooth, and the process may be repeated, each tooth of the saw being gauged in this manner if desired. Instead of reading the angle of each tooth, if preferred, the arm 37 may be set to the desired theoretical angle to which all of the teeth should conform, and it may be clamped in this position by tightening the thumb nut 32. When thus set, the arm 37 may be brought successively into contact with the various teeth, and observations may be made as to whether or not the bar lies snugly along the edge of each tooth, thus determining whether or not each tooth is at the correct angle.

Figure 2:
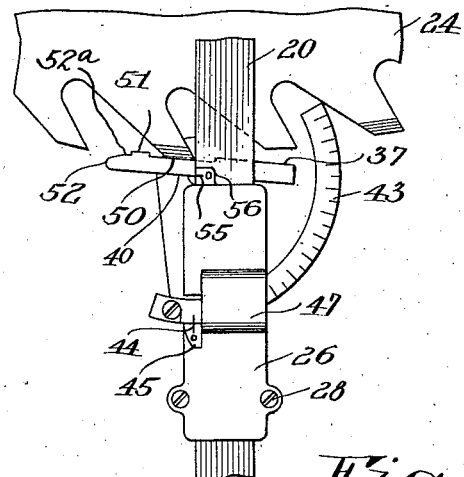
Fig. 2 is a fragmentary view illustrating the gauging of another angle of a tooth.

Fig. 2 shows the device used to measure the angle of the flat end of each tooth. In this instance, the tooth may be placed in contact with the flat bottom of the notch 50, or if preferred the arm 37 may be slid leftwardly so that the end of the tooth may lie against a portion of the arm to the right of the notch. In other respects the use of the device when measuring an angle as illustrated in Fig. 2 is similar to the use as above described in connection with Fig. 1, and a further detailed description thereof is accordingly thought to be unnecessary.

Figure 3:
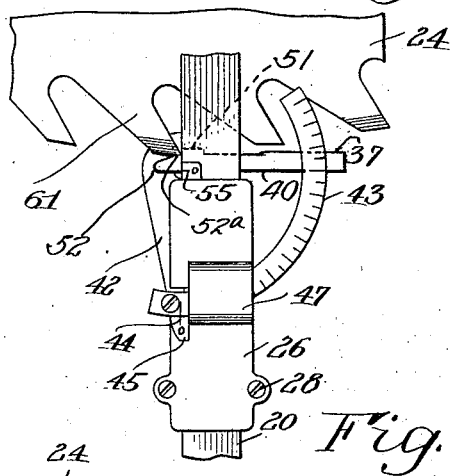
Figs. 3 and 4 are views showing the gauging of the height of a high and a low tooth respectively.

In Fig. 3 the device is illustrated as being used to gauge the height of a tooth, a high tooth 61 being selected in this instance. When used for gauging the height of teeth, the arm 37 may be set to 90° and clamped in this position by the thumb nut 32. The flat edge 52a of the bar 40 just to the left of the notch 50 may then be used as an abutment, the frame 26 being slid along the bar 20 until this abutment portion 52a of the arm 37 comes into contact with the tip of the tooth, as shown. The frame may then be clamped in this position on the bar 20 by tightening the thumb screw 29, and the bar may be shifted to bring the same abutment portion of the arm 37 into contact with the next tooth having the same theoretical height.

If the saw being gauged is of the type in which all of the teeth are intended to be the same height, the device may be moved into contact with each tooth successively, to test whether each tooth comes into snug contact with the abutment portion of the gauge. It is obvious that if any tooth fails to touch the abutment, it is shorter than the tooth on which the abutment was originally set, and if any tooth extends beyond the abutment so that the abutment is not able to slide down over the end of the tooth, this tooth must be longer than the tooth on which the gauge was first set. In this way, it may be determined easily and quickly whether all of the teeth are of the same height, which is of great importance in the proper functioning of the saw.

Figure 4:
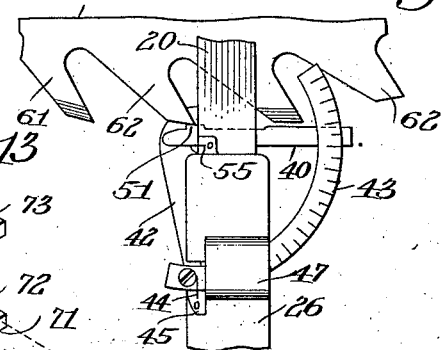

If, on the other hand, the saw is of the type in which high and low teeth are provided, the gauge may be used in the manner above described in testing the high teeth alone and it may also be similarly used in testing the low teeth alone, if desired. For gauging the comparative height of high and low teeth and determining whether they differ from each other by the proper amount, the abutment portion 52a of the arm 37 may first be brought into cooperation with the end of a high tooth 61. Then the bar 20 may be shifted circumferentially through the space of one tooth to bring the parts into cooperation with a low tooth 62, and the arm 37 may be shifted longtiudinally to bring the lug 51 rather than the abutment 52a into contact with the end of the tooth. This position is illustrated in Fig. 4. It will be remembered from the above description that the distance by which the lug 51 is offset from the bottom of the notch 50 and the abutment portion 52a is equal to the theoretical or intended difference in height between high and low teeth of the saw being tested. Therefore, if the frame 26 be clamped in such a position that the abutment portion 52a will contact with the end of a high tooth 61, it follows that the abutment portion 51 should contact with the ends of the low teeth 62. In this manner, not only may the heights of the various high teeth and the various low teeth be gauged or checked by themselves, but the difference in height between high teeth and low teeth may likewise be gauged accurately.

Figure 13:
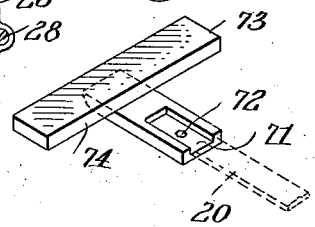
Fig. 13 is an inverted perspective view of a fixture applicable to the device to enable its use on band saws, hacksaws, and other straight saws as distinguished from circular saws.

For use on straight saws such as band saws, large hacksaws, or other saws of similar type as distinguished from circular saws, the annular fixture 21 may be removed from the end of the bar 20 by taking out the screw 22 and a T-shaped fixture may be substituted. Such a fixture is shown in perspective in Fig. 13, in inverted or upside down position. It comprises a portion 70 having a socket 71 for receiving the bar 20, this bar being shown in dotted lines and being held in the socket by a screw passing through the hole 72. A cross piece 73 is integral with or fixed to the portion 70, and has an edge 74 arranged in a plane perpendicular to the edge 25 of the bar 20.

When a T-shaped fixture of this kind is applied to the device, the surface 74 of the fixture may be brought into contact with the back of the band saw, hacksaw, etc., and the bar 20 will then extend across the blade of the saw in a direction perpendicular to the back. The bar may be moved along the saw so as to bring its edge 25 into alinement with the ends of various teeth, and no matter to what position the device is moved lengthwise of the saw, the bar will always remain perpendicular to the back, so that the true angles or true heights of the teeth may be determined. As the use of the device when gauging heights or angular characteristics of teeth of straight saws is substantially the same as the use above described in connection with circular saws, no further description thereof is thought to be necessary.

It will be understood that a complete device as furnished to a purchaser may include, if desired, one bar 20 and one frame 26 slidable thereon; several interchangeable arms 37 having lugs 51 of various heights so that they may be used in connection with saws with different variations between the heights of high and low teeth; several annular fixtures 21 of various diameters for use in connection with different sized mandrels 23 for circular saws of various dimensions; and one T-shaped fixture for use when gauging band saws, hacksaws, or other straight saws.

While certain embodiments of the invention have been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a saw gauge, the combination with a member adapted to be movably mounted on a saw, of means for guiding the movements of said member relative to said saw, a device carried by said member and lying in the plane of the saw and angularly adjustable in said plane relative to said member, said device being settable to a position corresponding to certain angular characteristics of teeth on said saw whereby to gauge said characteristics, and scale means cooperating with said device for indicating the position to which it is adjusted.

2. In a saw gauge, the combination with a member adapted to be movably mounted on a saw, of means for guiding the movements of said member relative to said saw, and a device carried by said member, and including an arm in the plane of the saw adapted to be placed in contact with an edge of a saw tooth for gauging the angular characteristics thereof, said arm being angularly adjustable in said plane relative to said member.

3. In a saw gauge, the combination with a member adapted to be movably mounted on a saw, of means for guiding the movements of said member relative to said saw, an arm mounted on said member and lying in the plane of the saw and being adapted to be placed in contact with an edge of a saw tooth to gauge the angular characteristics thereof, said arm being angularly adjustable in the plane of the saw relative to said member, and scale means cooperating with said arm for indicating the position to which it is adjusted.

4. In a saw gauge for circular saws, the combination with a member adapted to be movably mounted on a saw, of means for guiding said member for rotary movement around the center of said saw, an arm, and means for mounting said arm on said member so that said arm is angularly adjustable relative to said member about an axis substantially perpendicular to the plane of the saw and in alinement with one edge of said member, said arm being adapted to be placed in contact with an edge of a saw tooth to gauge the angular relation between said edge of the saw tooth and said edge of said member.

5. In a saw gauge for circular saws, the combination with a member adapted to be movably mounted on a saw, of means for guiding said member for rotary movement around the center of said saw with one edge of said member extending along a radius of said saw, an arm, means for mounting said arm on said member so that said arm is angularly adjustable relative to said member about an axis in alinement with said radial edge of said member, said arm being adapted to be placed in contact with an edge of a saw tooth to gauge the angular relation between said edge of the saw tooth and a radius of said saw, and means whereby said arm is movable radially with respect to said axis so that it may be projected variable distances into a space between two saw teeth.

6. In a saw gauge, the combination with a member adapted to be mounted on a circular saw for pivotal movement about the center of the saw as an axis, of a frame slidable along said member, an arm, means for pivotally mounting said arm on said frame, said arm having a portion in the plane of the saw and placeable in contact with an edge of a saw tooth to gauge the angular characteristics thereof, and scale means cooperating with said arm for indicating the position to which it is set.

7. In a saw gauge, the combination with a member adapted to be movably mounted on a saw, of means for guiding the movements of said member relative to said saw, and an abutment adjustably mounted on said member, said abutment having a portion placeable in contact with the ends of high teeth on said saw to test the alinement thereof with each other, and having another portion placeable in contact with the ends of low teeth on said saw to test their alinement, said two portions being offset from each other by a distance equal to the intended difference in height between high and low teeth on the saw being tested.

8. In a saw gauge, the combination with a member adapted to be mounted on a circular saw for pivotal movement about the center of the saw as an axis, of a frame slidable along said member, an arm pivotally mounted on said frame, said arm having a portion in the plane of the saw placeable in contact with an edge of a saw tooth to gauge the angular characteristics thereof, one portion of said arm constituting an abutment placeable in contact with the ends of high teeth on said saw to test the alinement thereof with each other, and another portion of said arm constituting an abutment placeable in contact with the ends of low teeth on said saw to test their alinement, said two abutment portions being offset from each other by a distance equal to the intended difference in height between high and low teeth on the saw being tested.

9. In a saw gauge, the combination with a member adapted to be movably mounted on a saw, of means for guiding said member for definite predetermined movement relative to said saw, a frame adjustable on said member, an arm lying in the plane of the saw, means for mounting said arm on said frame for pivotal movement about an axis substantially perpendicular to the plane of the saw and for radial movement relative to said axis so that said arm may project different distances from said axis, to enable said arm to be laid along an edge of a saw tooth to gauge angular characteristics of such tooth, and a plurality of abutment portions on said arm for gauging height of saw teeth.

EMANUEL STAUDER.